United States Patent
Johansson et al.

(10) Patent No.: US 6,507,470 B1
(45) Date of Patent: Jan. 14, 2003

(54) METHOD AND ARRANGEMENT FOR SHORTENING THE RECOVERY TIME OF A LINE DRIVER

(75) Inventors: Hans Johansson, Bergshamra (SE); Ulf Lundin, Stockholm (SE)

(73) Assignee: Telefonaktiebolaget LM Ericsson (SE)

( * ) Notice: Subject to any disclaimer, the term of this patent is extended or adjusted under 35 U.S.C. 154(b) by 299 days.

(21) Appl. No.: 09/652,027

(22) Filed: Aug. 31, 2000

(30) Foreign Application Priority Data

Sep. 3, 1999 (SE) .............................................. 9903116

(51) Int. Cl.[7] .............................. H02H 3/00; H02H 3/26; H02H 5/00
(52) U.S. Cl. ............................... 361/59; 361/60; 361/72
(58) Field of Search ............................... 361/59, 60, 72, 361/73

(56) References Cited

U.S. PATENT DOCUMENTS

| | | | | |
|---|---|---|---|---|
| 4,440,980 A | * | 4/1984 | Bakker | 330/298 |
| 4,849,846 A | * | 7/1989 | Hung et al. | 361/111 |
| 4,856,059 A | * | 8/1989 | Halbig | 361/106 |
| 4,866,768 A | * | 9/1989 | Sinberg | 379/413 |
| 4,896,352 A | | 1/1990 | Dabin | 379/412 |
| 5,390,231 A | | 2/1995 | Hung et al. | 379/2 |
| 5,392,349 A | * | 2/1995 | Elder, Jr. | 361/119 |
| 5,537,287 A | * | 7/1996 | Dreier | 361/119 |
| 5,668,866 A | * | 9/1997 | Eriksson | 361/119 |
| 5,696,391 A | | 12/1997 | Bernier | 257/146 |
| 5,739,999 A | | 4/1998 | Gruber et al. | 361/56 |
| 5,872,842 A | * | 2/1999 | Daly et al. | 379/377 |
| 6,172,864 B1 | * | 1/2001 | Bremond et al. | 361/111 |
| 6,178,080 B1 | * | 1/2001 | Wilken et al. | 361/103 |

FOREIGN PATENT DOCUMENTS

| | | | |
|---|---|---|---|
| EP | 0 291 169 A1 | 11/1988 | H04M/3/18 |
| JP | 1241261 | 9/1989 | H04M/19/00 |

OTHER PUBLICATIONS

PCT International–Type Search Report dated Jul. 10, 2000.

* cited by examiner

*Primary Examiner*—Bao Q. Vu
(74) *Attorney, Agent, or Firm*—Burns, Doane, Swecker & Mathis, L.L.P.

(57) ABSTRACT

To shorten the recovery time of a line driver (1) after an overvoltage on its output terminal (3), a current generating device (5) senses a voltage difference between the output voltage of the line driver (1) and its supply voltage (UB) plus a threshold voltage (UT'), and supplies a current (I) that is proportional to the sensed voltage difference up to a maximum current to the output (3) of the line driver (1) to raise its potential to thereby shorten its recovery time.

5 Claims, 2 Drawing Sheets

METHOD AND ARRANGEMENT FOR SHORTENING THE RECOVERY TIME OF A LINE DRIVER

This application claims priority under 35 U.S.C. §§119 and/or 365 to 9903116-3 filed in Sweden on Sep. 3, 1999; the entire content of which is hereby incorporated by reference.

TECHNICAL FIELD

The invention relates generally to subscriber line interface circuits and more specifically to a method and an arrangement for shortening the recovery time of a line driver in a subscriber line interface circuit after an overvoltage on its output terminal.

BACKGROUND OF THE INVENTION

In subscriber line interface circuits (SLICs), line drivers connected to tip and ring wires of respective transmission lines, have to be turned off when the voltage on the tip or ring wire comes close to the negative supply voltage of the line drivers.

The line drivers are turned off in order to avoid an uncontrolled function that could lead to the destruction of the line drivers.

When turned off, the line drivers are put in a high-impedance state with no ability to sink or source current. This may lead to that the line drivers are stuck in this state for a longer or shorter time.

An example of a situation when this can occur is when a charged line is connected to the SLIC after a ringing sequence.

SUMMARY OF THE INVENTION

The object of the invention is to eliminate these problems with the known line drivers.

This is obtained by the method and the arrangement in accordance with the invention by initiating a current generation before the turn-off function is activated with the purpose of "pulling" the tip and/or ring wires, i.e. actually the voltage of the tip and/or the ring wires, into the active operating range of the line drivers.

Hereby, the recovery time of the line drivers after an overvoltage will be considerably shortened.

BRIEF DESCRIPTION OF THE DRAWING

The invention will be described more in detail below with reference to the appended drawing on which

DESCRIPTION OF THE INVENTION

Figure 1A:
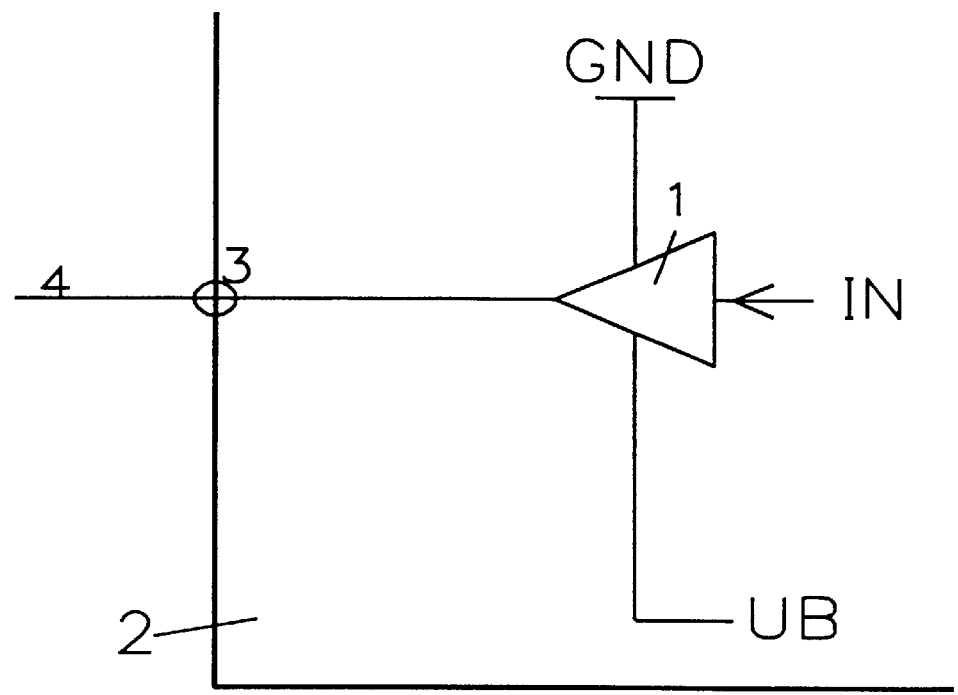
FIG. 1A shows a known line driver connected to a wire of a transmission line.

FIG. 1A shows a known line driver 1 in a SLIC 2, which is not shown as to the rest.

The line driver 1 is connected with its output terminal 3 to one wire 4 of a two-wire transmission line to a load, e.g. a subscriber station (not shown).

The supply voltage terminals of the line driver 1 are connected between ground GND and a negative supply voltage UB.

The input terminal of the line driver 1 is connected to means (not shown) for generating input signals IN.

Figure 1B:
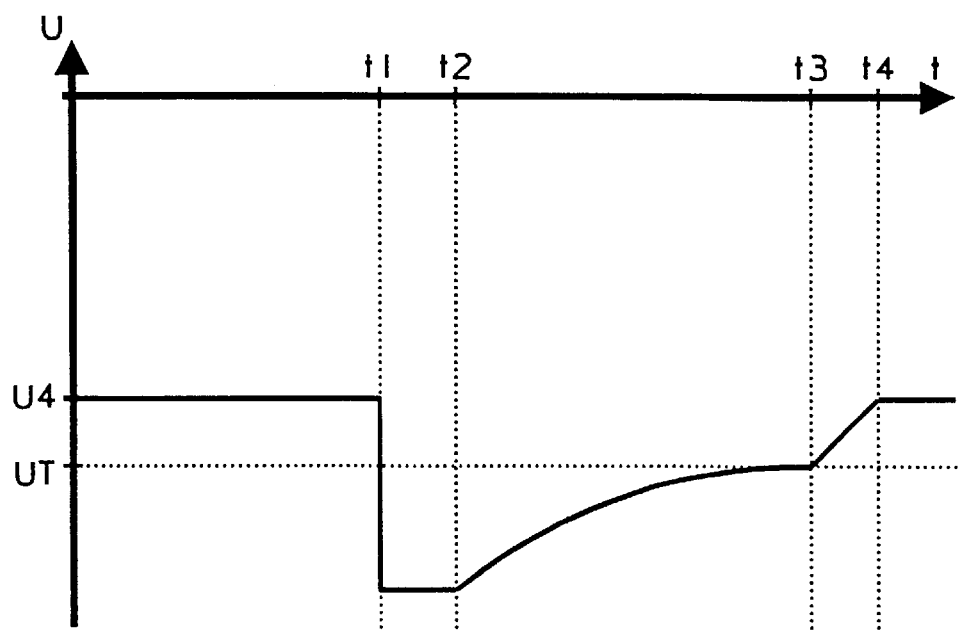
FIG. 1B is a diagram illustrating a recovery of the line driver in FIG. 1A after an overvoltage on its output terminal.

FIG. 1B is a diagram illustrating how an overvoltage on the output terminal 3 of the line driver 1 in FIG. 1A is handled by the line driver 1. By overvoltage is meant a voltage that, in the embodiment in FIG. 1B, is more negative than a turn-off or threshold voltage UT at which the line driver 1 is turned off when the overvoltage appears, and at which the line driver 1 is turned on again when the overvoltage has disappeared in a manner known per se.

As mentioned above in the introductory portion, an overvoltage can appear on a wire 4 when the transmission line after a ringing sequence is connected to the SLIC 2.

In normal operation, the voltage on the wire 4 is supposed to be U4.

At time t1, an overvoltage that is more negative than the threshold voltage UT, appears.

In a manner known per se, as mentioned above, the line driver 1 is instantaneously turned off when the voltage equals the threshold voltage UT at time t1 in this case, and stays turned off as long as the overvoltage is present.

Suppose that the overvoltage ends at time t2. Then, the line driver 1 starts to recover in an uncontrolled manner, mainly due to internal leakage currents. At time t3, the output voltage of the line driver 1 is supposed to equal UT. At that time t3, the line driver 1 is turned on again in a manner known per se as indicated above, entering its active state, and recovers quickly in a controlled manner to the voltage U4 at time t4.

Thus, the recovery process is terminated at time t4. This means that the recovery time is equal to the time between times t2 and t4 in the line driver 1 in FIG. 1A.

Figure 2A:
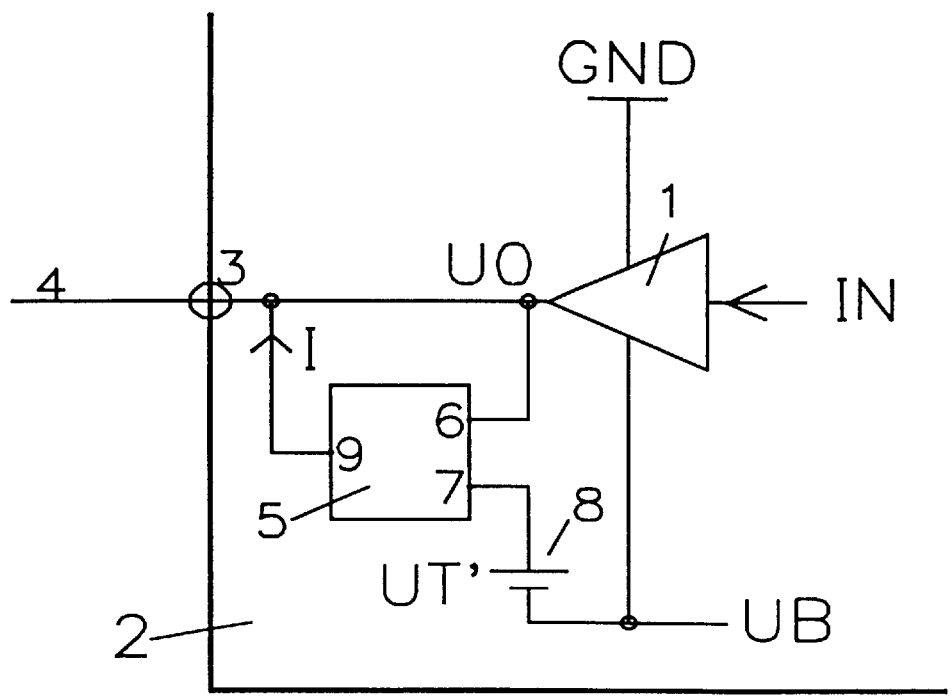
FIG. 2A shows the line driver in FIG. 1A with an arrangement according to the invention.
Figure 2B:
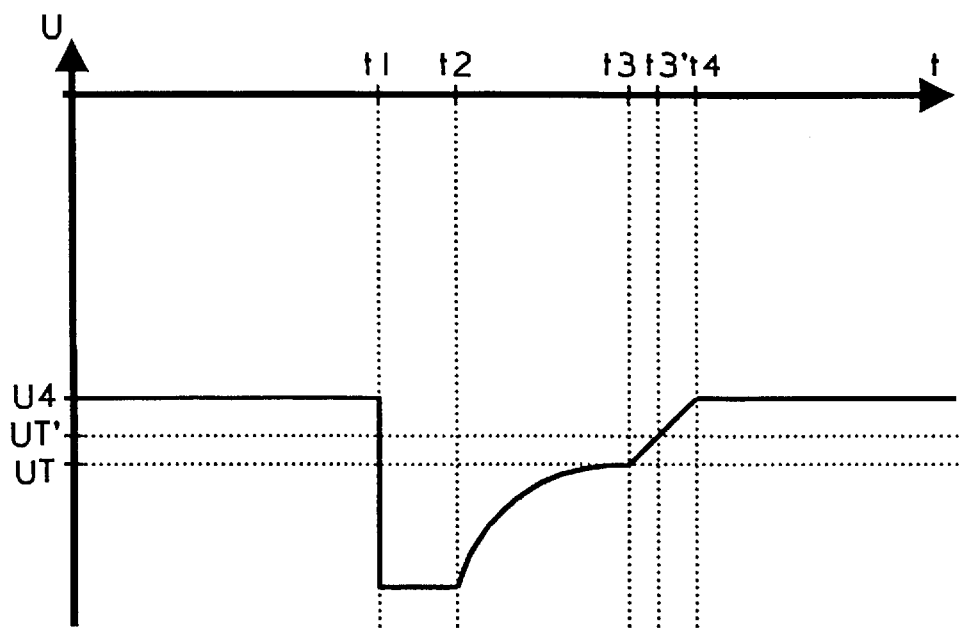
FIG. 2B is a diagram illustrating the recovery of the line driver in FIG. 2A after an overvoltage on its output terminal.

Components, voltages and times in FIGS. 2A and 2B that are identical to those in FIGS. 1A and 1B have been provided with identical reference characters.

In FIG. 2A, the line driver 1 is provided with an arrangement according to the invention for shortening its uncontrolled recovery time after an overvoltage on its output terminal 3, exceeding the threshold voltage UT.

In the embodiment illustrated in FIG. 2A, this arrangement comprises a voltage-to-current converter 5.

The converter 5 is connected with one input terminal 6 to the output 3 of the line driver 1, with its other input terminal 7 to the supply voltage UB via a voltage source 8 providing a threshold voltage UT', and with its output terminal 9 to the output 3 of the line driver 1 as shown in FIG. 2A.

The threshold voltage UT' is more positive than the threshold voltage UT as apparent from FIG. 2B. In view of the fact that both threshold voltages UT' and UT are fixed relative to the supply voltage UB, the difference between the threshold voltages UT' and UT is constant regardless of variations of the supply voltage UB.

The voltage-to-current converter 5 is adapted to generate an output current I that is proportional to the voltage difference between the output voltage UO of the line driver 1 and the supply voltage UB plus the threshold voltage UT' up to a maximum current value. The maximum value of the output current I of the converter 5 will not be reached until UO<UT.

In accordance with the invention, this current generation always starts before the turn-off function of the line driver 1 is activated at the threshold voltage UT.

Hereby, it is avoided that the line driver 1 is stuck in an uncontrolled state In FIG. 2B, as in FIG. 1B, when the overvoltage equals the threshold voltage UT at time t1, the line driver 1 is turned off and stays turned off until the overvoltage disappears at time t2.

However, already when the voltage difference UO−UB<UT', the voltage-to-current converter 5 begins to generate the current I.

Due to this controlled output current I of the converter 5 to the output 3 of the line driver 1, i.e. to the transmission line 4, the voltage of the output terminal 3 of the line driver 1 starts to increase in a controlled manner towards the threshold voltage UT after that the overvoltage disappears at time t2.

When the voltage at the output 3 of the line driver 1 equals UT, the line driver 1 is turned on in a manner known per se as indicated above, and its output voltage quickly recovers to the voltage U4 at time t4 as in FIG. 1B.

When the voltage difference UO−UB>UT' at time t3', the voltage-to-current converter 5 stops generating the current I.

Instead of the current generating device in the form of the voltage-to-current converter 5 as described with reference to FIGS. 2A and 2B, a comparator (not shown) can be used to sense the voltage difference, and a current generator (not shown) controlled by the output signal of the comparator, can be used to supply the current I to the output 3 of the line driver 1.

As should be apparent from the above, by generating the current I in accordance with the invention, the voltage of the output of the line driver will be "pulled" into the active operating range of the line driver, and its the recovery will be quicker than in line drivers known so far.

What is claimed is:

1. A method of shortening the recovery time of a line driver after an overvoltage on its output terminal, characterized by sensing a voltage difference between the output voltage of the line driver and its supply voltage plus a threshold voltage, generating a current that is proportional to the sensed voltage difference up to a maximum current, and supplying said generated current to the output terminal of the line driver to raise the voltage of the output terminal of the line driver to thereby shorten its recovery time.

2. The method as claimed in claim 1, characterized by setting the threshold voltage to a value that is less than a turn-off voltage of the line driver.

3. An arrangement for shortening the recovery time of a line driver (1) after an overvoltage on its output terminal (3), characterized in that it comprises a current generating device (5) that is connected with its inputs (6, 7) to sense the voltage difference between the output voltage of the line driver (1) and its supply voltage (UB) plus a threshold voltage (UT'), and that is connected with its output (9) to supply to the output terminal (3) of the line driver (1), a current (I) that is proportional to the sensed voltage difference up to a maximum current to raise the potential on the output terminal of the line driver to thereby shorten its recovery time.

4. The arrangement as claimed in claim 3, characterized by means (8) for setting said threshold voltage (UT') to a value that is less than a turn-off voltage (UT) of the line driver (1).

5. The arrangement as claimed in claim 4, characterized in that said means (8) for setting said threshold voltage (UT') is a voltage source.

* * * * *